(12) United States Patent
Viorel et al.

(10) Patent No.: US 11,026,219 B2
(45) Date of Patent: Jun. 1, 2021

(54) SYSTEMS AND METHODS FOR FAST CONTROL MESSAGING FOR MULTIPLE NUMEROLOGY ACCESS ZONES

(71) Applicant: CABLE TELEVISION LABORATORIES, INC, Louisville, CO (US)

(72) Inventors: Dorin Viorel, Erie, CO (US); Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/449,195

(22) Filed: Jun. 21, 2019

(65) Prior Publication Data

US 2019/0327720 A1    Oct. 24, 2019

Related U.S. Application Data

(62) Division of application No. 15/787,346, filed on Oct. 18, 2017, now Pat. No. 10,375,684.

(Continued)

(51) Int. Cl.

| | |
|---|---|
| *H04L 27/26* | (2006.01) |
| *H04W 72/04* | (2009.01) |
| *H04W 72/12* | (2009.01) |
| *H04L 1/00* | (2006.01) |
| *H04J 13/00* | (2011.01) |
| *H04L 5/00* | (2006.01) |

(Continued)

(52) U.S. Cl.
CPC ....... *H04W 72/042* (2013.01); *H04J 13/0062* (2013.01); *H04L 1/0082* (2013.01); *H04L 5/00* (2013.01); *H04L 5/0053* (2013.01); *H04L 5/0064* (2013.01); *H04L 5/0094* (2013.01); *H04L 27/2602* (2013.01); *H04L 27/2613* (2013.01); *H04W 72/1273* (2013.01); *H04W 72/1289* (2013.01); *H04L 1/08* (2013.01); *H04L 5/0007* (2013.01); *H04L 2027/0024* (2013.01)

(58) Field of Classification Search
CPC .......... H04W 72/042; H04W 72/1289; H04W 72/1273; H04L 5/0094; H04L 5/0064; H04L 5/00; H04L 5/0053; H04L 27/2602; H04L 27/2613; H04L 1/0082; H04L 1/08; H04L 5/0007; H04L 2027/0024; H04J 13/0062

See application file for complete search history.

(56) References Cited

U.S. PATENT DOCUMENTS

| | | | |
|---|---|---|---|
| 2003/0147371 A1* | 8/2003 | Choi | H04B 7/2637 370/341 |
| 2017/0048787 A1* | 2/2017 | Lindoff | H04W 56/0035 |
| 2018/0077710 A1* | 3/2018 | Ly | H04L 5/0064 |

* cited by examiner

*Primary Examiner* — Said M Elnoubi
(74) *Attorney, Agent, or Firm* — Armstrong Teasdale LLP

(57) ABSTRACT

A method is provided for detecting an access zone configuration of a downlink wireless transmission received from a wireless network by a receiver. The method includes steps of activating the receiver, synchronizing the receiver with the wireless network, detecting, by the receiver after the step of synchronizing, a received access zone of the downlink wireless transmission, determining a base symbol of the detected access zone, ascertaining a first gap and a second gap from repetitive information contained within the determined base symbol, concluding, from the ascertained first and second gaps, that the detected access zone is part of a multiple access zone configuration, and registering, after the step of concluding, the receiver with the wireless network.

19 Claims, 7 Drawing Sheets

Related U.S. Application Data

(60) Provisional application No. 62/409,490, filed on Oct. 18, 2016.

(51) Int. Cl.
*H04L 27/00* (2006.01)
*H04L 1/08* (2006.01)

SYSTEMS AND METHODS FOR FAST CONTROL MESSAGING FOR MULTIPLE NUMEROLOGY ACCESS ZONES

CROSS REFERENCE TO RELATED APPLICATIONS

This application is a divisional of U.S. application Ser. No. 15/787,346, filed Oct. 18, 2017, which prior application claims the benefit of and priority to U.S. Provisional Patent Application Ser. No. 62/409,490, filed Oct. 18, 2016, both of which are incorporated herein by reference in their entireties.

BACKGROUND

The field of the disclosure relates generally to management of wireless communications, and more particularly, to wireless communications utilizing multiple numerology access zones.

Conventional wireless communication systems, such as Long Term Evolution (LTE) and Worldwide Interoperability for Microwave Access (WiMAX), operate in 4G networks and utilize technologies that implement a singular numerology, which is the combination of subcarrier spacing and symbol duration. LTE, for example, supports system bandwidths up to 20 MHz with a mostly fixed orthogonal frequency-division multiplexing (OFDM) numerology having 15 kHz spacing (with some limited exceptions) between OFDM tones/subcarriers. Due to recent advances in the silicon industry, however, 5G networks allow for simultaneous multiple numerology support, that is, multiple different carrier spacings and symbol durations, which enables multiple access zones to be optimized to meet a wide range of Quality of Service (QoS) requirements and deployment scenarios.

Having multiple access zones with different numerologies enables efficient transmission since numerology of each access zone can be tailored to a different traffic type having different QoS requirements. For example, wider subcarrier spacing along with shorter symbol duration enables low latency communication. Having a flexible numerology is also beneficial to support mobile units observing different propagation characteristics. For example, channel estimation accuracy is a function of the mobile speed and scattering characteristics of the channel. This requires adaptation of pilot signal densities according to the given propagation channel characteristics to improve channel estimation accuracy and link quality. In LTE, however, the 15 kHz subcarrier spacing is fixed and common to all user equipment (UE). Thus, conventional LTE system designs have resulted in increased overhead for some UEs, while limiting performance in other UEs.

Accordingly, it is desirable to be able to utilize the relatively new multiple numerology support capability offered by 5G, and in particular, 3GPP 5G New Radio (NR), access to increase efficiency of the communication without requiring significant structural modifications to network transmission systems. It would be further desirable to implement systems and methods that may quickly and efficiently determine whether a transmission is within a single access zone or a multiple access zone and, if a multiple access zone is detected, enable rapid switching between numerologies at the receiver end, while still avoiding cross-numerology interference, but while also reducing transmission latency.

BRIEF SUMMARY

In an embodiment, a method is provided for detecting an access zone configuration of a downlink wireless transmission received from a wireless network by a receiver. The method includes steps of activating the receiver, synchronizing the receiver with the wireless network, detecting, by the receiver after the step of synchronizing, a received access zone of the downlink wireless transmission, determining a base symbol of the detected access zone, ascertaining a first gap and a second gap from repetitive information contained within the determined base symbol, concluding, from the ascertained first and second gaps, that the detected access zone is part of a multiple access zone configuration, and registering, after the step of concluding, the receiver with the wireless network.

In an embodiment, a method is provided for embedding fast signaling information into a plurality of frequency gaps separating different numerology access zones of a multiple access zone architecture in a wireless network. The method includes a step of introducing the fast signaling information into a plurality of first slots of a first gap of the plurality of gaps. The first gap precedes a first access zone of the multiple access zone structure. The method further includes a step of embedding, into a plurality of second slots of a second gap of the plurality of gaps, a time-shifted repetition of the fast signaling information introduced into the plurality of first slots. The second gap is disposed between the first access zone and a second access zone of the multiple access zone architecture, and the first access zone has a different numerology than the second access zone.

In an embodiment, a user equipment is provided for a wireless communications system. The user equipment includes a radio control layer configured to receive a downlink of a wireless transmission from the wireless communication system, and a physical layer configured to detect a first gap preceding a first access zone of the downlink, and interlace digital information, embedded within the detected first gap, into a second gap preceding a second access zone of the downlink. The first gap is different than the second gap, and the first access zone has a different numerology than the second access zone.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
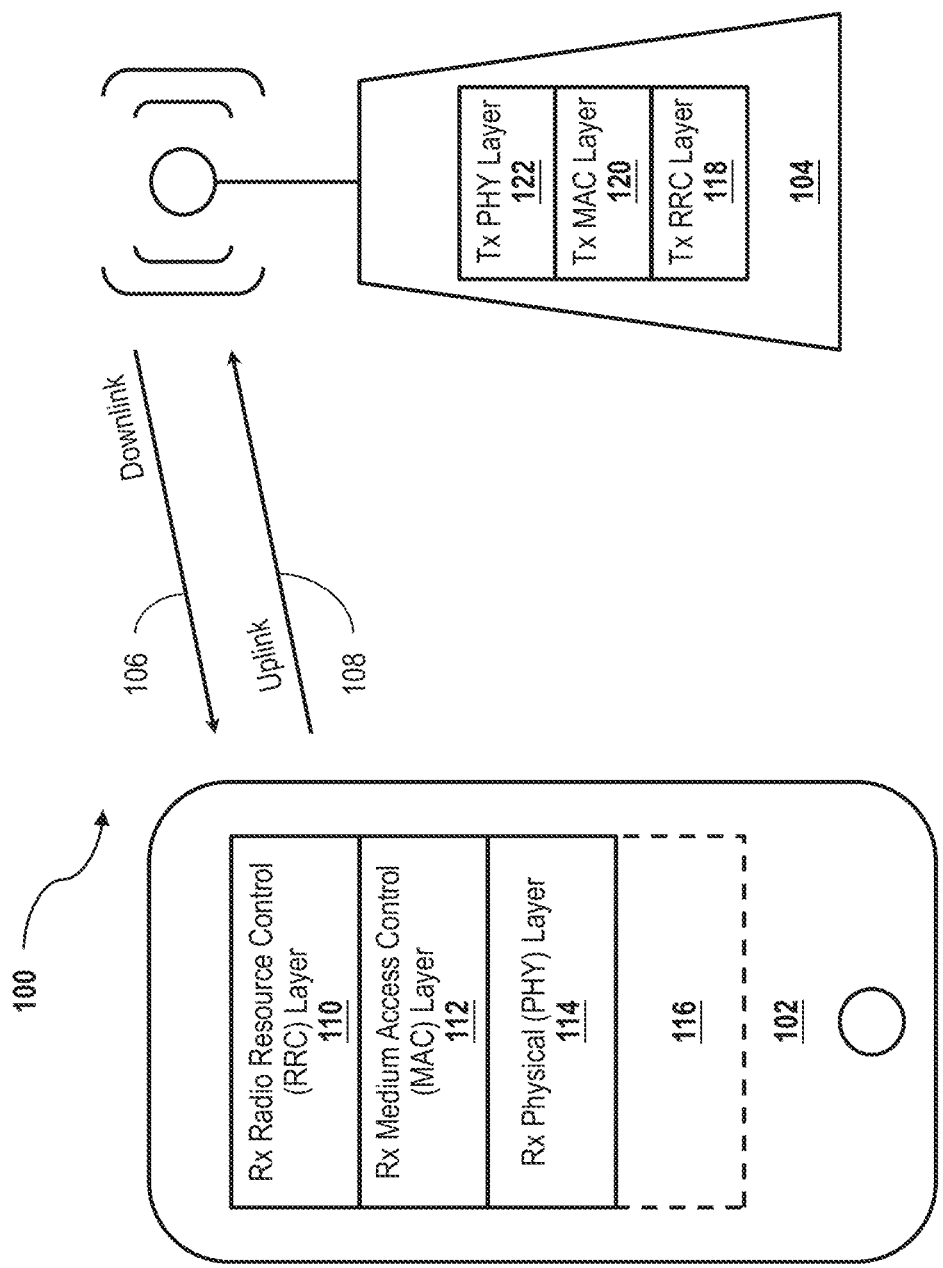
FIG. 1 is a schematic illustration of a wireless access system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, "user equipment," or UE, refers to an electronic device or system utilizing a wireless technology protocol, such as LTE or WiMAX (e.g., IEEE 802.16 protocols). Furthermore, "Wi-Fi device" refers to an electronic device, such as a station (or STA), that has the capability to access and implement one or more existing IEEE 802.11 protocols. For example, a UE may include, without limitation, a mobile handset or similar device that implements an LTE transmission, and a Wi-Fi device may include, without limitation, one or more of a laptop, a desktop personal computer (PC), personal digital assistant (PDA), AP, and a Wi-Fi phone/smartphone. A UE or Wi-Fi device may be fixed, mobile, or portable, and includes a transceiver or transmitter/receiver combination. A UE or Wi-Fi device may be separate devices, or may be represented as a single device that includes media access control (MAC) and physical layer (PHY) interface that is both 802.11-conformant and 802.16-conformant to a wireless medium.

The following description relates to systems and methods for simultaneous multiple numerology support to optimize rapid switching between different numerologies in multiple access zones, according to the type of wireless traffic detected. The present systems and methods are of particular use with 5G technology, and beyond, and reduce latency between numerologies, as well as cross-numerology interference.

In an exemplary embodiment, the present systems and methods utilize PHY architectures to exploit frequency gaps in between different numerologies, which serve to avoid cross numerology interference, in order to enable more rapid switching between numerologies. That is, since different numerology access zones require band gaps to reduce the interference among the zones, the present embodiments utilize these gaps for fast messaging when pseudo-noise sequences are employed. The embodiments thus provide faster messaging capability to signal on-the-fly multiple zone allocations, implementing pseudo-noise sequences that exhibit low interference when detected against the simultaneous numerologies. The novel embodiments presented herein may therefore be implemented within the PHY architecture, without requiring additional MAC support. The present embodiments may also be advantageously implemented as programmable instructions within the PHY layer of a receiver, which would significantly reduce the need for expensive structural upgrades to the network.

In some embodiments, the pseudo-noise sequences utilize constant amplitude zero auto-correlation (CAZAC) waveforms or functions, which may then be applied or inserted into the gaps to transmit information without requiring higher layer control signaling, and without practical interference added to the rest of the access zones beyond the gap. In at least one embodiment, the CAZAC function is a Zadoff Chu sequence. Zadoff Chu sequences exhibit strong auto- and cross-correlation properties, and thus are particularly valuable for enabling operation in high-interference conditions.

As described herein, the present systems and methods may be implemented alone, or in combination with one or more of the other embodiments described herein. In some embodiments, the several embodiments may be implemented simultaneously, or separately in succession. These advantageous techniques are described further below with respect to the several drawings.

FIG. 1 is a schematic illustration of a wireless access system 100. System 100 includes at least one user equipment (UE) 102 and a base station 104. As described above, UE 102 is, for example, a mobile handset or device capable of receiving a wireless communication downlink 106 from, and transmitting a return wireless communication uplink 108 to, base station 104. In an exemplary embodiment, downlink 106 and uplink 108 are an LTE, WiMAX, or 3GPP 5G NR transmission, and/or implement OFDM or orthogonal frequency-division multiple access (OFDMA) modulation schemes, as well as associated numerologies.

In the exemplary embodiment, base station 104 is, for example, an E-UTRAN Node B, also known as Evolved Node B (abbreviated as eNodeB or eNB), or a Next Generation Node B (abbreviated as gNodeB or gNB), which may further include hardware or structural elements that that communicatively couple with a mobile phone network (not shown). In this embodiment, UE 102 includes functional and/or programmable structural elements, such as a receiver radio resource control (RRC) layer 110, a receiver MAC layer 112, and a receiver PHY layer 114. In some embodiments, UE 102 further includes optional hardware or software layers 116, which may include, for example, a memory or storage database, a packet data convergence protocol (PDCP) layer, logical channels, transport channels, or other programmable processing layers (not separately shown). In a similar manner, base station 104 includes one or more corresponding functional and/or programmable structural elements, such as a transmitter RRC layer 118, a transmitter MAC layer 120, and a transmitter PHY layer 122.

In some embodiments, base station 104 further includes a base transceiver station (BTS) for a Global System for Mobile communication (GSM) network. In at least one embodiment, UE 102 has Wi-Fi capability, and includes a transceiver or cooperative node (not shown) to establish a Wi-Fi communication with an access point (also not shown). In operation, UE 102 is powered, turned on, or otherwise activated, and attempts to synchronize with the wireless communication network (e.g., 3GPP 5G NR), that transmits through base station 104. UE 102 achieves synchronization, and detects whether the network is a single access zone or a multiple access (MA) zone, as explained further below with respect to FIG. 2. After the zone detection, UE 102 registers with the network according to conventional registration means. Additional channel estimation, switching, or other wireless transmission processes may then be performed in a similar manner, according to the same general principles described below.

Figure 2:
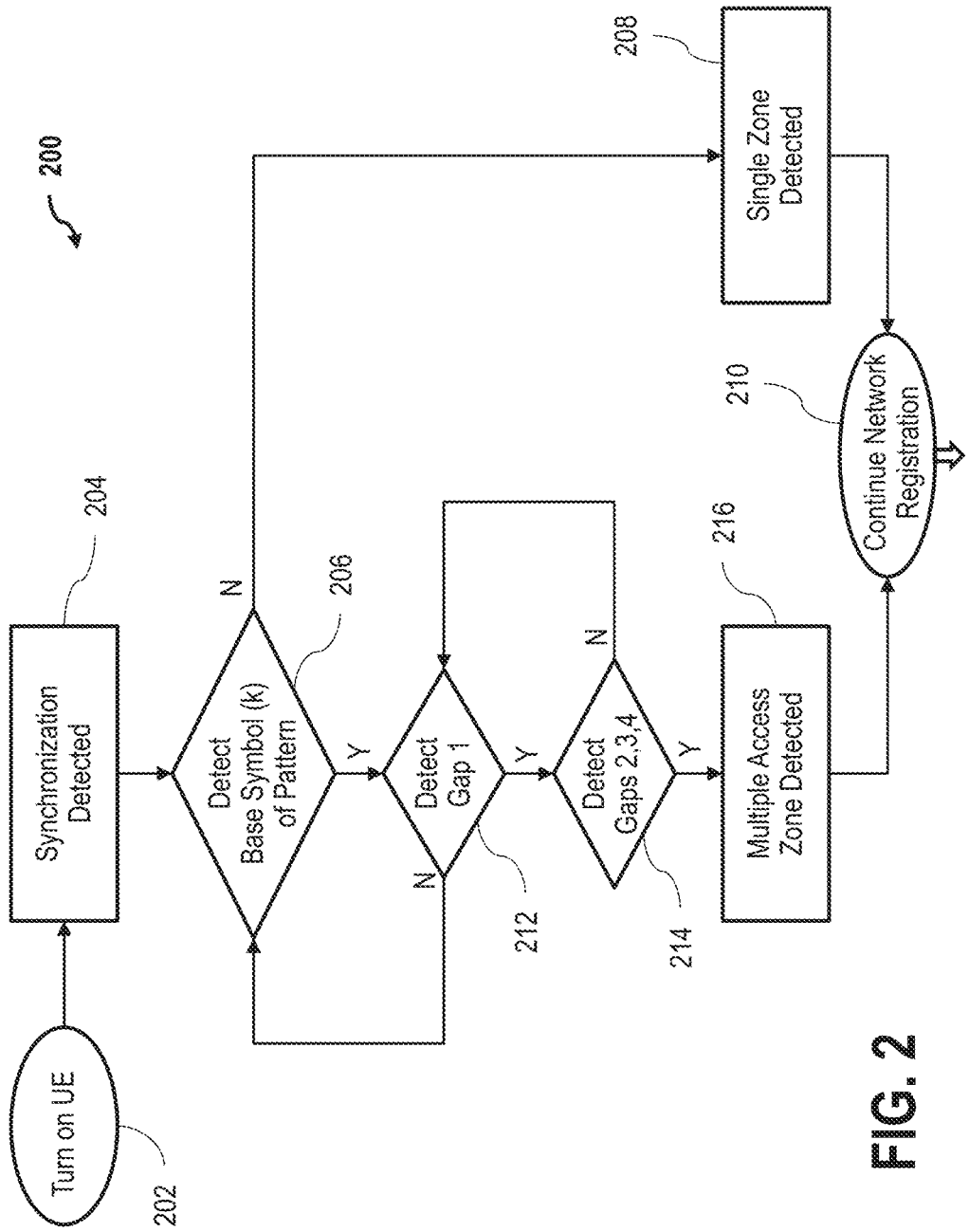
FIG. 2 is a flow chart diagram of an exemplary access zone detection process, according to an embodiment.

FIG. 2 is a flow chart diagram of an exemplary access zone detection process 200. In exemplary operation, detection process 200 begins at step 202, where a UE (e.g., UE 102, FIG. 1) is powered, turned on, or activated to wirelessly communicate with a wireless network (e.g., through base station 104, FIG. 1). Once UE is activated for wireless communication, process 200 proceeds to step 204. In step 204, the UE synchronizes with the network and detects an access zone. In the exemplary embodiment, the synchronization and access zone detection includes symbol and slot timing. After the synchronization is achieved and the access zone is detected, process 200 proceeds to step 206.

Step 206 is a decision step. In step 206, an algorithm of process 200 evaluates the transmission pattern to determine whether a base symbol, k, of the pattern can be detected. If no base symbols or slots are detected, process 200 proceeds to step 208, and concludes that the detected access zone is a single access zone (also referred to as a "single zone"), and then proceeds to step 210, in which the UE continues with, or completes, network registration. If, in step 206, the base symbol k of a gap pattern is detected, process 200 proceeds to step 212. Step 212 is also a decision step. In step 212, process 200 determines if gap 1 of the pattern can be detected by examining repetitive symbols within the detected slots. In the exemplary embodiment, process 200 detects gap 1 by determining that the repetitive symbols within slots 0, 1, and 2 of the first detected symbol are present only on gap 1. If, in step 212, gap 1 is not detected, process 200 returns to step 206.

If, in step 212, gap 1 is detected, process 200 proceeds to step 214, in which process 200 determines whether additional gaps (e.g., gaps 2, 3, 4) may be detected. In the exemplary embodiment, gaps 3, 5, etc. are detected based on the information present slots 0, 1, etc. of symbol 1. Step 214 is also decision step. If, in step 214, additional gaps are not detected, process 200 returns to step 212. However, if additional gaps are detected in step 214, process 200 proceeds to step 216, and concludes that the detected access zone is part of a multiple access zone architecture. That is, in step 216, the algorithm of process 200 concludes that the access zone under investigation is an MA zone, and then proceeds to step 210 to continue network registration.

Figure 3:
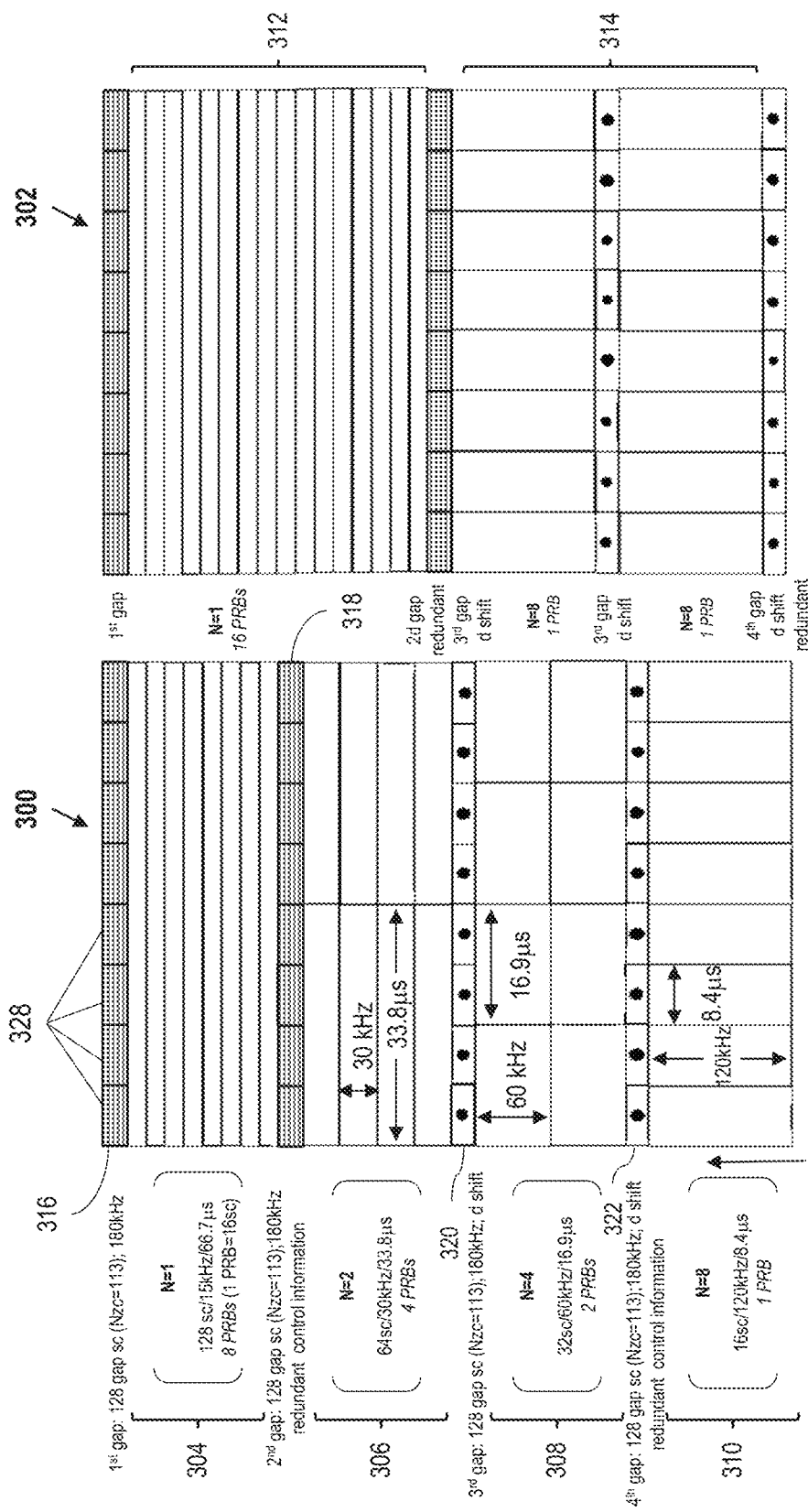
FIG. 3 illustrates exemplary multiple access signaling architectures for the system depicted in FIG. 1 and the process depicted in FIG. 2.

FIG. 3 illustrates exemplary multiple access signaling architectures 300 and 302, which may be implemented with wireless access system 100, FIG. 1, and/or detection process 200, FIG. 2. In the exemplary embodiment, architecture 300 represents a 4-zone implementation, and includes a first access zone 304, a second access zone 306, a third access zone 308, and a fourth access zone 310. Exemplary architecture 302 represents a 2-zone implementation, and includes a primary access zone 312, and a secondary access zone 314. In this example, designations such as "first," "second," "primary," and "secondary" are used to distinguish between respective elements of the embodiments, and should not be construed as limiting.

Referring to the 4-zone implementation of architecture 300, a first gap 316 precedes first access zone 304, a second gap 318 is between first access zone 304 and second access zone 306, a third gap 320 is between second access zone 306 and third access zone 308, and a fourth gap 322 is between third access zone 308 and fourth access zone 310. Thus, although the overall bandwidth of each access zone is 120 kHz per zone, the carrier spacing (shown in the vertical direction) in each of access zones 304, 306, 308, 310 is determined according to the spacing of individual subcarriers within the respective zone. Carrier spacing is illustrated in FIG. 3 by columns of physical resource blocks (PRBs) 324, set against the rows of symbols 326, the relationship of which vary according to which access zone is being considered. In this example, each PRB 324 represents 16 individual subcarriers, that is, 1 PRB=16 subcarriers, each access zone includes a number (N) of symbols having a fixed symbol duration, and each of gaps 316, 318, 320, 322 employs 128 subcarriers over 180 kHz (described further below respect to FIG. 4).

In the exemplary embodiment, first access zone 304 includes 8 PRBs 324(1) between first gap 316 and second gap 318. Each of the 8 PRBs 324(1) in first access zone 304 has a frequency bandwidth of 15 kHz, for a total bandwidth of 120 kHz across first access zone 304. First access zone 304, for example, may represent LTE, which generally implements a subcarrier spacing of 15 kHz, and/or which could also represent outdoor/macro coverage having a frequency division duplex (FDD)/time division duplex (TDD) <3 GHz. In the example illustrated in FIG. 3, first access zone 304 hosts 128 total subcarriers (e.g., 8 PRBs*16 subcarriers per PRB) for 1 symbol (e.g., one symbol wide, or N=1) having a symbol duration of 66.7 μs. In this example, the 66.7 μs symbol is modulated on the 15 kHz tone for a particular cell radius (described further below with respect to FIG. 6).

According to this exemplary embodiment, second access zone 306 includes 4 PRBs 324(2) between second gap 318 and third gap 320. Each of the 4 PRBs 324(2) in second access zone 304 has a frequency bandwidth of 30 kHz, for a total bandwidth of 120 kHz across second access zone 304. Second access zone 306, for example, may represent outdoor/small cell transmissions having a TDD>3 GHz. Second access zone 306 hosts 64 total subcarriers (e.g., 4 PRBs*16 subcarriers per PRB) for 2 symbols (e.g., N=2), each having a symbol duration of 33.8 μs. In a similar manner, third access zone 308 includes 2 PRBs 324(3) between third gap 320 and fourth gap 322, each having a frequency bandwidth of 60 kHz, also for a total bandwidth of 120 kHz across third access zone 308. Third access zone 308, for example, may represent indoor wideband transmissions having a TDD of 5 GHz (e.g., unlicensed, or LTE-U). Third access zone 308 hosts 32 total subcarriers (e.g., 2 PRBs*16 subcarriers per PRB) for 4 symbols (e.g., N=4), each having a symbol duration of 16.9 μs. Similarly, fourth access zone 310 includes 1 PRB 324(4) following fourth gap 322, and having a frequency bandwidth of 120 kHz. Fourth access zone 310, for example, may represent mmWave transmissions having a TDD of 28 GHz. Fourth access zone 310 thus hosts 16 total subcarriers (e.g., 1 PRB*16 subcarriers per PRB) for 8 symbols (e.g., N=8), each having a symbol duration of 8.4 μs.

In one embodiment, carrier spacing ($f_0$) may be implemented according to the following equation:

$$f_0 = f_{sc} * 2^{Nsc} \qquad \text{(Eq. 1)}$$

Where $f_{sc}$=a bandwidth of a particular subcarrier, and $N_{sc}$=a scaling factor (e.g., [−2:1:4, etc.]) for the number of subcarriers in the multiple access zone(s). Thus, in an alternative embodiment, where spacing, number of symbols, and duration may vary: (1) a first access zone (Nsc=1) hosts 15 kHz subcarriers, with a 66.7 µs symbol duration, and 1 PRB=128 subcarriers; (2) a second access zone (Nsc=2) hosts 30 kHz subcarriers, with a 133.4 µs symbol duration, and 1 PRB=64 subcarriers; (3) a third access zone (Nsc=3) hosts 60 kHz subcarriers, with a 266.8 µs symbol duration, and 1 PRB=32 subcarriers; and (4) a fourth access zone (Nsc=4) hosts 120 kHz subcarriers, with a 533.6 µs symbol duration, and 1 PRB=16 subcarriers. In other embodiments, these values, as well as the respective numerologies may further vary without departing from the scope of the embodiments described herein.

In the exemplary embodiment, each of gaps 316, 318, 320, 322 represents a frequency gap that is inserted between different respective access zones to allow switching from one numerology to another, and informational data is inserted into frequency gaps 316, 318, 320, 322, which may itself be processed by either or both of a system receiver (e.g., receiver 102, FIG. 1) and a system transmitter (e.g., transmitter 104, FIG. 1), without substantially interfering with the carrier transmission signals from the respective access zones.

In the exemplary embodiment, the informational data that is introduced, or embedded, into respective slots 328 of the frequency gaps includes Zadoff-Chu functions or waveforms (or comparable CAZAC functions). In at least one embodiment, a Zadoff-Chu sequence is embedded within each of symbol of the respective gap. In this example, the size of the respective Zadoff-Chu sequence is the same for each symbol, but different with respect to the sequence root. That is, subsequent Zadoff-Chu sequences are time-shifted from the original root sequence. The Zadoff-Chu function has particularly strong auto-correlation properties, and does not significantly interfere with adjacent carriers in respective access zones. By using time-shifted Zadoff-Chu sequences, a significant amount of control information may be embedded to the gaps, but without substantially increasing the system receiver may more easily trace the root of the sequence in a quick and efficient manner.

As illustrated, first gap 316 employs 128 subcarriers/180 kHz and, as described further below with respect to FIG. 4, an Nzc=113 Zadoff-Chu (ZC) function is supported with two surrounding 7.5 gap subcarrier guard bands. In this example, first gap 316 includes eight slots 328 (8.4 µs) per symbol. Third gap 320 similarly includes eight slots 328 per symbol, and employs 128 subcarriers/180 kHz, and an Nzc=113 ZC function supported with 2×7.5 gap subcarrier guard bands. Third gap 320 differs from first gap 316 in that third gap 320 includes a δ time shift from the root sequence. In this example, second gap 318 replicates the content of first gap 316 with redundant control information, and fourth gap 322 replicates the content of third gap 320, with relevant δ time shift and redundant control information. In an exemplary embodiment, the redundant control information matches the number of root sequences, and redundant sequences are aligned with the respective base. In some embodiments, the control information is introduced using 6 bits per slot 328. In other embodiments, the control information utilizes 3 bits/slot.

According to the exemplary embodiment, the total bandwidth from the subcarriers employed, with respect to gaps 316, 318, 320, 322, is 4 gaps*180 kHz per gap=720 kHz. In an alternative embodiment, additional gaps may be implemented according to the number of different numerologies that are employed simultaneously, or additional gaps may be utilized as redundant information within an architecture having fewer access zones. The 2-zone implementation of architecture 302 illustrates an example of four gaps implemented with two access zones. Similar to architecture 300, architecture 302 includes a first gap 316' preceding primary access zone 312, and a second gap 318' between primary access zone 312 and secondary access zone 314. Different from architecture 300 though, architecture 302 includes a third gap 320' within secondary access zone 314, and a fourth gap 322' following secondary access zone 314.

According to the present systems and methods, when two related Zadoff-Chu functions are processed simultaneously—i.e., two Zadoff-Chu functions of the same order, but time-shifted apart by a cyclic shift, or lag, δ—cross-correlation products may be detected in addition to expected auto-correlation products. In this example the format the Zadoff-Chu function may be expressed by:

$$a_q(n) = \exp\left[-j\pi q * \frac{n(n+1)}{N_x}\right], \qquad (Eq.\ 2)$$
$$q \in \{1, \ldots N_x - 1\}, n = 0, 1, \ldots N_x - 1$$

Where q is the Zadoff-Chu sequence root index and n takes integer values in the range 0, 1, ... 112 (i.e., N=113). Accordingly, the Zadoff-Chu function preserves the auto-correlation/auto-correlation products, as well as a circularly-shifted version of itself, and remaining orthogonal with the original ZC replica according to:

$$r_{kk}(\delta) = \Sigma_{n=0}^{N_{ZC}-1} a_k(n) a_k^*[(n+\partial)] \qquad (Eq.\ 3)$$

Where $r_{kk}(\delta)$ represents the discrete periodic auto-correlation function of $a_k$ at lag δ. The amplitude, $A_{CC}$, of the cross-correlation product may then be expressed according to:

$$A_{CC} = 1/(N_{ZC})^{\wedge}0.5 \qquad (Eq.\ 4)$$

Thus, for a value of $N_{ZC}$=113, $A_{CC}$=0.09 (assuming that |q1−q2| is prime to $N_{ZC}$, which is achieved because $N_{ZC}$ is a prime number (i.e., 113 this example)). In an exemplary embodiment, when the cross-correlation products are present, sensitivity degradation of the Zadoff-Chu function-related auto-correlation products is further offset by rendering the two correlated Zadoff-Chu functions (e.g., zero-root and δ-shifted) redundant in the frequency domain. This redundancy thereby results in a 6 dB gain increase in the auto-correlation products detected by the receiver. Accordingly, the Zadoff-Chu information that is embedded into the gaps provides excellent auto-correlation properties, and maintains a constant amplitude without adding the noise to the carrier signals. Furthermore, subsequent Zadoff-Chu sequences may be created by simply time-shifting an original root sequence.

Figure 4:
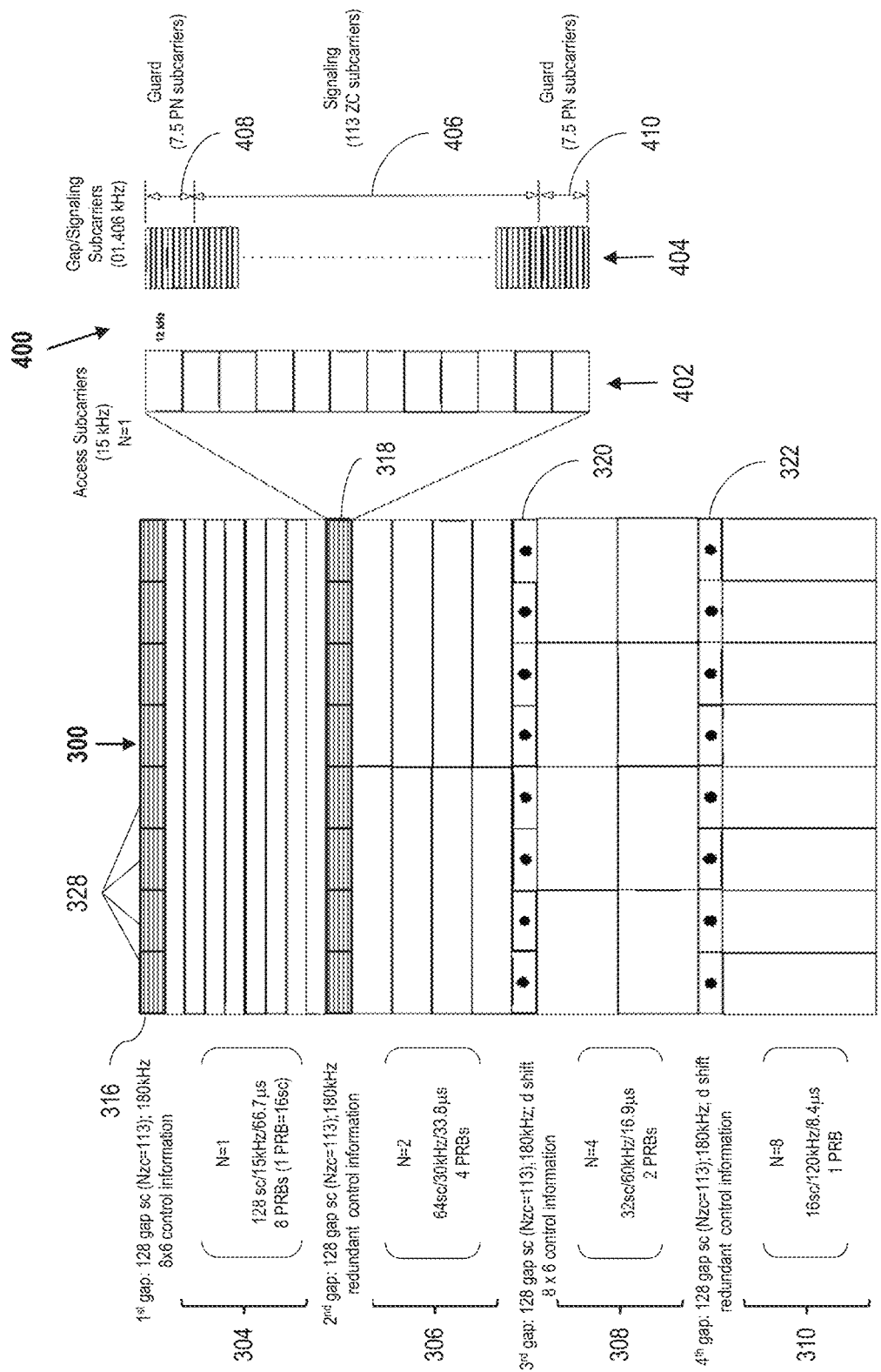
FIG. 4 illustrates an exemplary signaling symbol structure for the architecture depicted in FIG. 3.

FIG. 4 illustrates an exemplary signaling symbol structure 400 for architecture 300, FIG. 3. In the exemplary embodiment illustrated in FIG. 4, structure 400 depicts a first exploded view 402 with respect to a one-symbol wide (N=1) access zone hosting 15 kHz subcarriers (e.g., first access zone 304, FIGS. 3, 4, or primary access zone 312, FIG. 3), and also depicts a second exploded view 404 with respect to a 180 kHz gap employing 128 gap subcarriers (e.g., gaps 316, 318, 320, 322). Second exploded view 404 includes a signaling portion 406 disposed between first guard portion 408 and second guard portion 410. In the exemplary embodiment, signaling portion 406 includes 113 signaling subcarriers ($N_{ZC}$=113), and first and second guard portions 408, 410 include 15 guard subcarriers (e.g., 7.5 guard subcarriers each).

In an exemplary embodiment, each of the subcarriers for signaling portion 406 and first and second guard portions 408, 410 has a width of 1.406 kHz (180 kHz total bandwidth divided by 128 subcarriers=1.406 kHz/subcarrier). In the exemplary embodiment, each of the signaling subcarriers includes an embedded Zadoff-Chu sequence. In some embodiments, the guard subcarriers also include embedded Zadoff-Chu sequences. As implemented with respect to the embodiments described above, the Zadoff-Chu information embedded into third gap 320 is the same as the Zadoff-Chu information embedded into first gap 316, but shifted in time by a lag δ. Accordingly twice the amount of information may be replicated across the symbol having 8 slots 328.

In at least one embodiment, the number of Zadoff-Chu roots per gap (32 in the illustrated example) is selected according to the synchronization accuracy of the transmitter-to-receiver frequency (e.g., transmitter 104 and receiver 102, FIG. 1). Where the signaling information uses 6-bit encoding, the signaling information may be embedded for each symbol (e.g., N=1) as 6×8 bits-slots, having a redundancy level ×2, that is, twice the amount of information (e.g., and a +6 dB gain, as described above). Accordingly, the total signaling information provided per symbol, for example, at third gap 320, is 6×8×2 (bits*slots*redundancy)=96 bits. In at least one embodiment, the six-bit encoding is obtained from related lookup tables at both the transmitter and receiver ends, in order to determine the appropriate Zadoff-Chu sequences.

Figure 5:
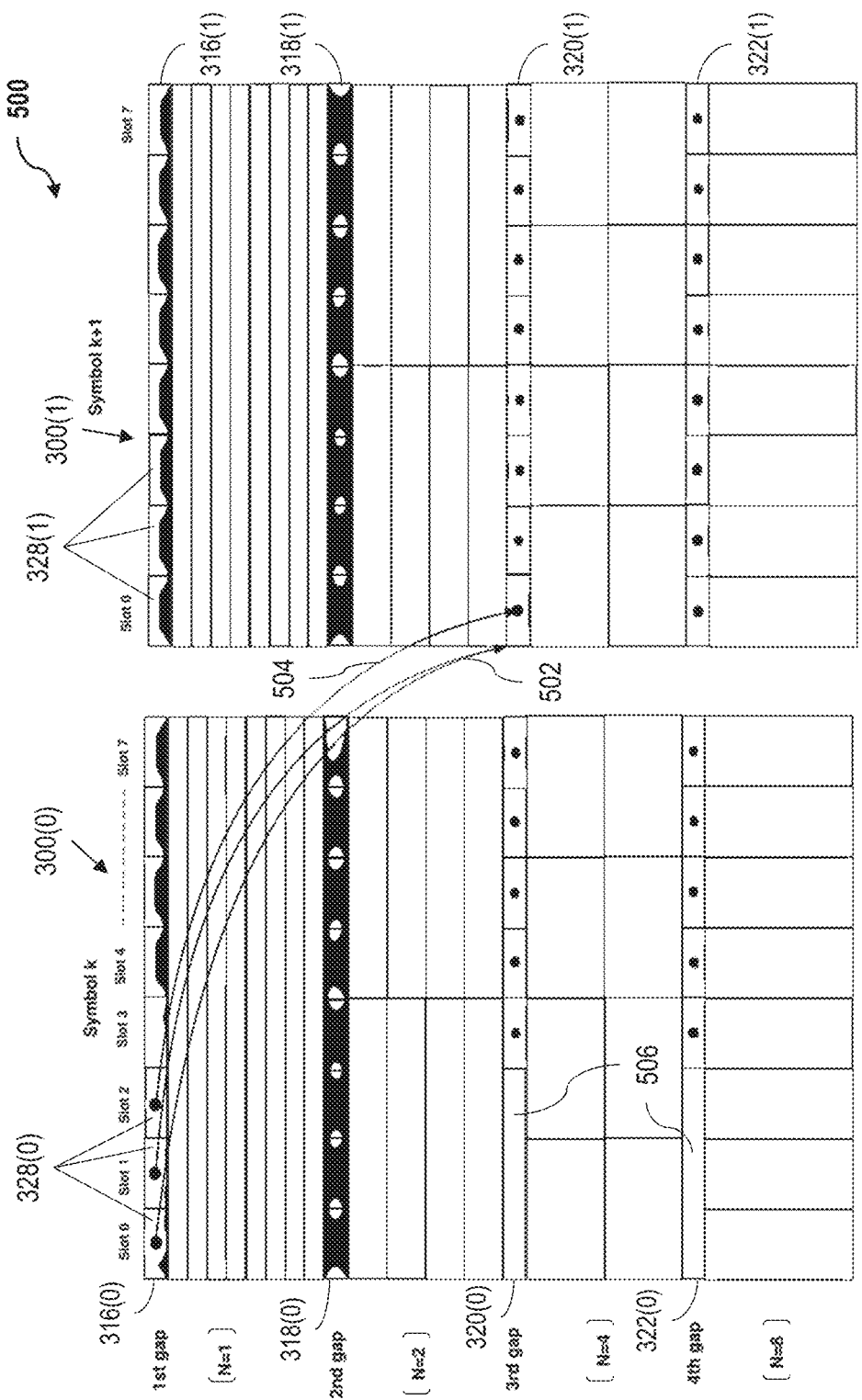
FIG. 5 illustrates an exemplary interlacing effect using the architecture depicted in FIG. 3 and the signaling symbol structure depicted in FIG. 4.

FIG. 5 illustrates an exemplary interlacing effect 500 using architecture 300, FIG. 3, and signaling symbol structure 400, FIG. 4. Interlacing effect 500 is illustrated in FIG. 5 with respect to architecture 300(0) for a symbol k, and to architecture 300(1) with respect to symbol k+1. In an exemplary operation, the first and second slots 328(0) of symbol k (i.e., slot 0 and slot 1 of first gap 316(0)) provide pointing information 502 that points to the position of third gap 320(1) of symbol k+1. In this example, third gap 320(1) includes the same Zadoff-Chu root information as first gap 316(0), but having a different cyclic shift/lag δ, and the cyclic shift δ is defined by lag information 504 from third slot 328(0) of symbol k (i.e., slot 2 of first 316(0)). The cyclic shift δ thus defines the Zadoff-Chu functions/sequences employed by third gap 320(1). Referring back to the embodiment described above with respect to FIG. 2, if pointing information 502 (and/or lag information 504) is not detected/detectable from the base symbol k (e.g., in step 206), process 200 may determine that the wireless communication of the symbol k is for a single access zone (e.g., in step 208).

In the example illustrated in FIG. 5, second gap 318 and fourth gap 322 are redundant, and optionally implemented. Optional implementations of redundant gaps may include, for example, high-sensitivity use cases, such as IoT, which may require extended coverage. In an exemplary embodiment, the redundant gaps (i.e., second and fourth gaps) employ a fixed frequency spacing with regard to their respective master gaps (i.e., first and third gaps), such as 1 PRB, for example. To compensate for the change in frequency from the respective master gap, a forward time-shift correction may be applied such that the two respective peaks (not shown) of the master gap and its corresponding redundant gap are over-imposed on one another. Accordingly, the first three slots 328(0) of gap 320(0) of symbol k (i.e., slot 0, slot 1, slot 2 of third gap 320(0)), as well as the first three slots 328(0) of corresponding fourth gap 322(0), are empty (i.e., no Zadoff-Chu sequences are embedded therein), and therefore become base slots 506, which thereby prevent slots 0, 1, 2 of symbol 300(0) (i.e., symbol k) from being used by a third or higher gap so that (i) double Zadoff Chu roots may be avoided, and/or (ii) the starting point of the third gap, as well as the related time shift, may be indicated.

Figure 6:
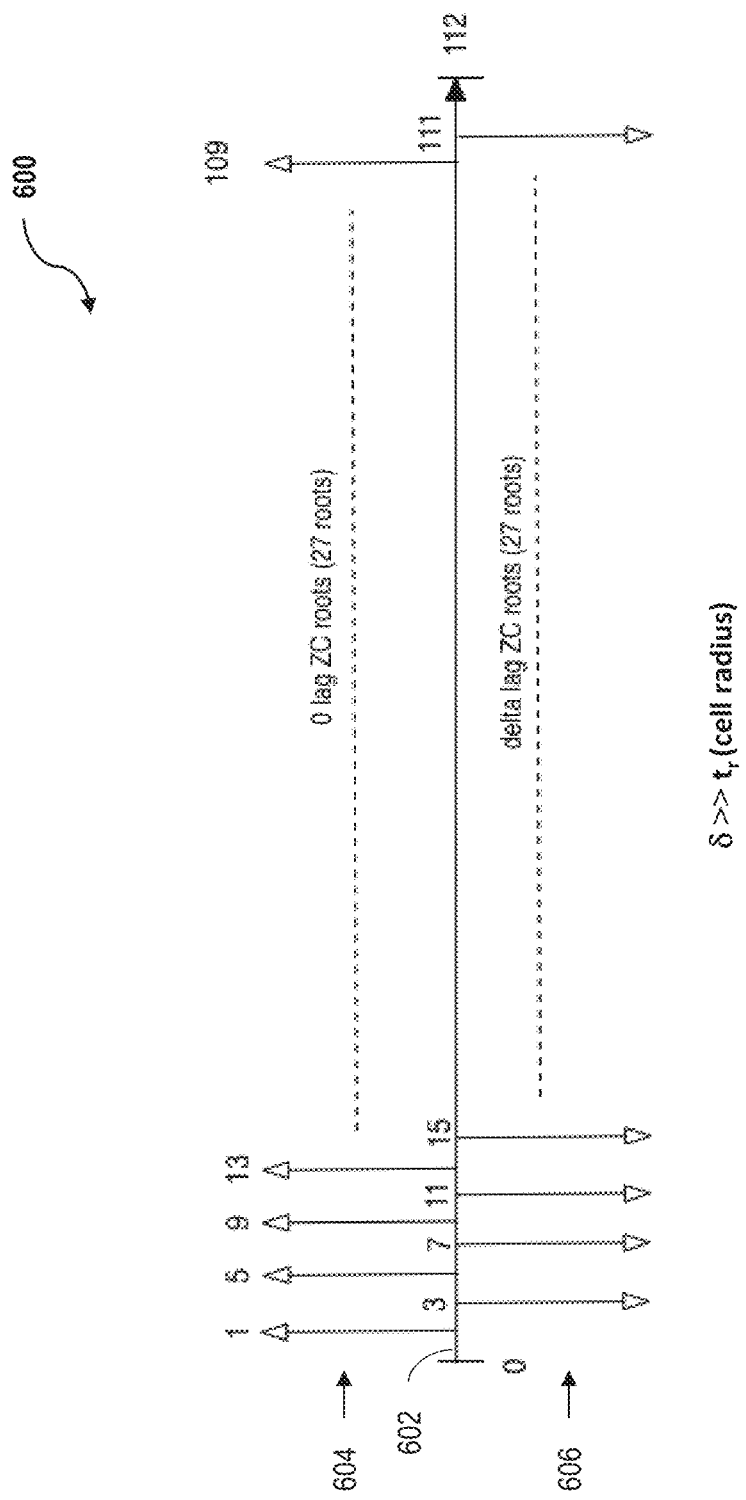
FIG. 6 illustrates an exemplary synchronization of the interlacing effect depicted in FIG. 5.

FIG. 6 illustrates an exemplary synchronization 600 of interlacing effect 500, FIG. 5. In an exemplary embodiment, synchronization 600 is implemented with respect to a plurality of signaling subcarriers 602 (e.g., signaling portion 406, FIG. 4) having Zadoff-Chu sequences or information embedded/encoded therein, and operates to synchronize first signaling subcarriers 604 with second signaling subcarriers 606 for a particular cell (not shown). First signaling subcarriers 604 include Zadoff-Chu information having 0-lag (i.e., not time-shifted) roots, and second signaling subcarriers 606 include Zadoff-Chu information having δ-lag roots. In this example, 27 Zadoff-Chu roots are included for both of the 0-lag and δ-lag roots, and thus the overall slot signaling capability will be 27 for this example.

In the exemplary embodiment, the time shift δ is greater than the synchronization time $t_r$. For the particular cell having a cell radius r. For example, given a cell radius of r=1 km, the time $t_r$=1E3/3E8 (in seconds)=3.3 μs, in the time shift δ=5 μs. The root selection granularity is then dependent on the accuracy of the synchronization. In this example, the synchronization accuracy $\delta f_s$ is determined as:

$$\delta f_s \leq 4*1.04 \text{ kHz}=4.16 \text{ kHz} \quad (\text{Eq. 5})$$

In an alternative embodiment, a coarser synchronization accuracy may be determined as:

$$\delta f_s \leq 7*1.04 \text{ kHz}=7.28 \text{ kHz} \quad (\text{Eq. 6})$$

Thus, the coarse synchronization capability of the LTE primary synchronization signal (PSS), that is, 7.5 kHz, may be closely approximated by this calculation. In this approximation, the slot signaling capability may utilize, for example, 4-bit encoding, and thereby realize an overall fast signaling capability for a multiple access structure that is 2 gaps*8 slots*4 bits=64 bits, for a synchronization stability $\delta f_s$=7.28 kHz.

Figure 7:
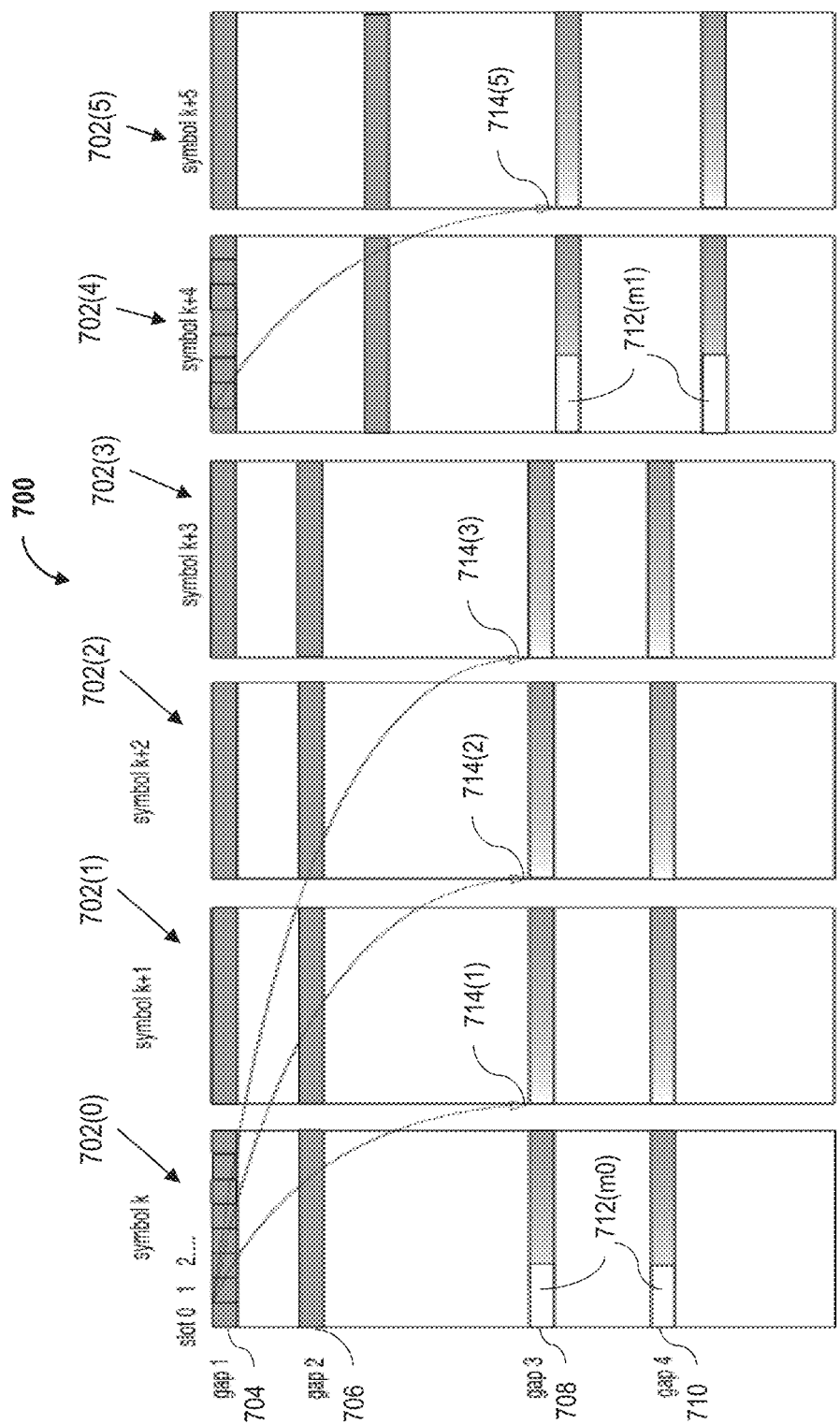
FIG. 7 illustrates an exemplary interlacing effect for a multiple access signaling architecture, according to an embodiment.

FIG. 7 illustrates an exemplary interlacing effect 700 for a multiple access signaling architecture, in accordance with the embodiments described above. In the embodiment illustrated in FIG. 7, interlacing effect 700 is implemented with respect to a plurality of consecutive symbols 702, with each symbol 702 including a first gap 704, a second gap 706, a third gap 708, and a fourth gap 710. In this example, the respective architectures of symbols 702 is similar to that described above with respect to architecture 300, FIG. 3, and interlacing effect 700 is similar to interlacing effect 500, FIG. 5, with respect to information interlaced between two particular symbols 702.

In exemplary operation of interlacing effect 700, for every m symbols (m=4 in this example), base slots 712 (i.e., slots 0, 1, 2 of third gaps 708(0), 710(4) and fourth gaps 710(0), 710(4)) are left empty, in order to allow appropriate decoding of the position 714 of the subsequent third gaps 708 within a particular group of m symbols (e.g., third gaps 708(1), 708(2), 708(3)), as well as the corresponding δ time shift (e.g., from the respective slot 3 of symbols 702(0), 702(4). Similar to the embodiments described above, second gap 706 and fourth gap 710 are optionally implemented, and may utilize (or re-use) the same δ time shifts as their corresponding first gap 704 and third 708, respectively. When optionally implemented, the positioning of second gap 706 and fourth gap 710 may be encoded (in PRB units) into particular non-base slots of first gap 704. For example, information regarding the positioning of second gap 706 may be included in slots 3 and 4 of first gap 704, and information regarding the positioning of fourth gap 710 may be included in slots 5 and 6.

In this example, the respective slot 7 of the leading symbol in a particular m-group (e.g., symbols 702(0), 702(4)) remains available for other signaling, as do all of the first and third gap slots of the subsequent symbols 702 within the m-group (e.g., 704(1), 704(2), 704(3)). This signaling availability may also be described as pertaining to the gaps 1 and 3 of the symbols k+1, k+2, . . . k+m−1, and pertaining to the slot 7 of gap 1 of the symbol k.

The systems and methods described above advantageously realize significantly faster messaging control between different numerologies in a multiple access communication system, as compared with conventional proposals. The present embodiments are able to efficiently detect at the receiver, following network synchronization, whether the frame structure employed by the downlink is a multiple access zone or a single access zone. According to the novel principles herein, a receiver encountering a multiple access zone is configured utilize particular signaling information that is embedded into the frequency gaps that separate the different numerology access zones to rapidly switch between numerologies.

A receiver according to the present embodiments is further able to advantageously utilize its PHY layer instead of the MAC/IP Stack content to even further improve messaging speed. At present, transmissions involving the PHY layer experience latency of no more than a few symbols, whereas similar transmissions involving the MAC layer experience latency of an order of magnitude or higher. Although MAC-related technology continues to improve, the relative latency difference with respect to the PHY layer is expected to remain the same.

As described above, where signaling information is embedded into the frequency gaps separating the numerology access zones, the advantageous systems and methods herein may carry the particular signaling information within the main frequency gaps (e.g., gaps 1, 3, etc.), and optionally utilize redundant frequency gaps (e.g., gaps 2, 4, etc.) to provide an 3 dB (or greater) improvement in signal to noise ratio (SNR) to compensate for a reduction in the detection sensitivity for the main frequency gaps, such as may occur from the cross-correlation products resulting from detecting two time-shifted ZC sequences simultaneously. As described herein, the redundant gaps provide an additional advantage in that they may be used to further separate access zones (e.g., using different numerologies), if desired.

In particular embodiments, the present systems and methods utilize orthogonal Zadoff-Chu sequences of the same length (e.g., Nzc=113) for the main frequency gap, and within the first main frequency gap, utilize a root Zadoff Chu sequence (e.g., has a zero time shift), but within the third frequency gap, utilize the Zadoff-Chu sequence having a time shift $\delta_3$ (or a time shift $\delta_5$ in a fifth frequency gap, etc.). The present embodiments advantageously time shifts $\delta$ such that the shifts are greater than the synchronization time or the expected cell radius. The time shifts $\delta$ may further be included in the signaling information using one slot (e.g., slot 3) of symbol k for a symbol sequence length of k symbols. According to the advantageous embodiments herein, the symbol sequence length indicates the time interval of a multiple access zone frame structure utilizing the set of numerologies, the FDD direction, the spectrum allocation, and the same duplex scheme.

As described above, the present embodiments realize further advantages by reserving slots 0, 1, and 2 of symbol k (the first symbol in a symbol sequence length) to be unused by gaps 3 or higher in order to i) avoid double Zadoff-Chu roots, and/or ii) indicate the starting point of the gap 3 and related time shift. Accordingly, the present embodiments further advantageously utilize redundant gaps to have an applied forward time shift, which may compensate for a frequency offset caused by a delta frequency offset that is referenced to a starting point of the first gap of the k symbol. By applying this forward time shift, the corresponding peaks of the main gap and the redundant may be over-imposed on one another, thereby improving the related SNR by 3 dB or greater.

Exemplary embodiments of multiple access zone transmission systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A method of detecting an access zone configuration of a downlink wireless transmission received from a wireless network by a receiver, the method comprising the steps of:
   activating the receiver;
   synchronizing the receiver with the wireless network;
   detecting, by the receiver after the step of synchronizing, a received access zone of the downlink wireless transmission;
   determining a base symbol of the detected access zone;

ascertaining (i) a first gap preceding the determined base signal, and (ii) a second gap based on repetitive information contained within the first gap;
concluding, from the ascertained first and second gaps, that the detected access zone is part of a multiple access zone configuration; and
registering, after the step of concluding, the receiver with the wireless network,
wherein the step of detecting the access zone includes receiving a slot timing of a plurality of slots within the base symbol.

2. The method of claim 1, wherein the detected access zone includes at least one of LTE, WiMAX, Wi-Fi, small cell, wideband, LTE-U, and mmWave subcarriers.

3. The method of claim 1, wherein the receiver is a user equipment (UE).

4. The method of claim 1, wherein the repetitive information is ascertained from the first three slots of the plurality of slots.

5. The method of claim 3, wherein the UE includes a radio control layer, a physical layer, and a media access control layer, and wherein the step of ascertaining is performed by the physical layer.

6. A method of detecting an access zone configuration of a downlink wireless transmission received from a wireless network by a receiver, the method comprising the steps of:
activating the receiver;
synchronizing the receiver with the wireless network;
detecting, by the receiver after the step of synchronizing, a received access zone of the downlink wireless transmission;
determining a base symbol of the detected access zone;
ascertaining (i) a first gap preceding the determined base signal, and (ii) a second gap based on repetitive information contained within the first gap;
concluding, from the ascertained first and second gaps, that the detected access zone is part of a multiple access zone configuration; and
registering, after the step of concluding, the receiver with the wireless network,
wherein the first gap is different than the second gap, wherein the first gap precedes a first access zone of the downlink wireless transmission, and
wherein the second gap precedes a second access zone of the downlink wireless transmission.

7. The method of claim 6, wherein the first access zone has a different carrier spacing than the second access zone.

8. The method of claim 6, wherein the first access zone has a different numerology than the second access zone.

9. The method of claim 6, wherein the repetitive information contained within the first gap points to a position within the second gap.

10. A system for detecting an access zone configuration of a downlink transmission from a wireless network, comprising:
a transceiver including a processor and a memory configured to store computer-executable instructions which, when executed by the processor, cause the transceiver to:
activate and synchronize with the wireless network;
receive the downlink transmission from the wireless network;
detect a first access zone from the received downlink wireless transmission;
determine a base symbol of the detected first access zone and receive a slot timing of a plurality of slots contained within the base symbol;
ascertain (i) a first gap preceding the determined base signal, and (ii) a second gap based on repetitive information contained within the first gap;
conclude, from the ascertained first and second gaps, that the first access zone is part of a multiple access zone configuration; and
register with the wireless network.

11. The system of claim 10, wherein the first access zone includes at least one of LTE, WiMAX, Wi-Fi, small cell, wideband, LTE-U, and mmWave subcarriers.

12. The system of claim 10, wherein the transceiver is a user equipment (UE), and wherein the downlink transmission is received from a base station.

13. The system of claim 12, wherein the UE includes a radio control layer, a physical layer, and a media access control layer, wherein radio control layer is configured to receive the downlink transmission, and wherein the physical layer is configured to ascertain the first and second gaps.

14. The system of claim 13, wherein the physical layer is further configured to determine the slot timing of the plurality of slots within the base symbol.

15. The system of claim 14, wherein the physical layer is further configured to ascertained the repetitive information from the first three slots of the plurality of slots.

16. The system of claim 13, wherein the first gap is different than the second gap, wherein the first gap precedes the first access zone, and wherein the second gap precedes a second access zone of the downlink transmission.

17. The system of claim 16, wherein the first access zone has a different carrier spacing than the second access zone.

18. The system of claim 16, wherein the first access zone has a different numerology than the second access zone.

19. The system of claim 16, wherein the repetitive information contained within the first gap points to a position within the second gap.

* * * * *